US010097255B2

(12) United States Patent
Cezanne et al.

(10) Patent No.: US 10,097,255 B2
(45) Date of Patent: Oct. 9, 2018

(54) JOINT CHANNEL AND PHASE NOISE ESTIMATION IN CONTROL SYMBOLS OF A MILLIMETER WAVE LINK

(71) Applicant: QUALCOMM Incorporated, San Diego, CA (US)

(72) Inventors: Juergen Cezanne, Ocean Township, NJ (US); Muhammad Nazmul Islam, Edison, NJ (US); Krishna Kiran Mukkavilli, San Diego, CA (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 14/959,671

(22) Filed: Dec. 4, 2015

(65) Prior Publication Data
US 2017/0005715 A1 Jan. 5, 2017

Related U.S. Application Data

(60) Provisional application No. 62/187,773, filed on Jul. 1, 2015.

(51) Int. Cl.
*H04W 4/00* (2018.01)
*H04B 7/06* (2006.01)
(Continued)

(52) U.S. Cl.
CPC ........ *H04B 7/0667* (2013.01); *H04J 13/0062* (2013.01); *H04L 5/0007* (2013.01);
(Continued)

(58) Field of Classification Search
None
See application file for complete search history.

(56) References Cited

U.S. PATENT DOCUMENTS

| 7,603,093 | B2 | 10/2009 | Kremer et al. |
| 7,609,752 | B2 | 10/2009 | Fujii et al. |

(Continued)

FOREIGN PATENT DOCUMENTS

GB 2500679 A 10/2013

OTHER PUBLICATIONS

ISA/EP, International Search Report and Written Opinion of the International Searching Authority, Int'l Application No. PCT/US2016/035771, dated Nov. 10, 2016, European Patent Office, Rijswijk, NL, 20 pgs.

(Continued)

*Primary Examiner* — Bob A Phunkulh
(74) *Attorney, Agent, or Firm* — Holland & Hart LLP

(57) ABSTRACT

Described herein are methods, systems, and apparatus for jointly estimating channel and phase noise in a control symbol. In one example, a method for wireless communication is described that includes inserting a control tone at a first periodicity in a first subcarrier of a control symbol and inserting a pilot tone at a second periodicity in a second subcarrier of the control symbol, the pilot tone being offset from the control tone in the control symbol. The method also includes transmitting the control symbol. In another example, a method for wireless communication is described that includes receiving a control symbol comprising a control tone at a first periodicity, and a pilot tone at a second periodicity, the pilot tone being offset from the control tone in the control symbol. The method also includes performing a phase noise estimation and a channel estimation from the pilot tone.

80 Claims, 11 Drawing Sheets

(51) Int. Cl.
*H04L 5/00* (2006.01)
*H04L 25/02* (2006.01)
*H04J 13/00* (2011.01)
*H04L 27/26* (2006.01)

(52) U.S. Cl.
CPC ......... H04L 5/0048 (2013.01); H04L 5/0053 (2013.01); H04L 25/022 (2013.01); H04L 25/0224 (2013.01); H04L 27/265 (2013.01)

(56) References Cited

U.S. PATENT DOCUMENTS

| | | | |
|---|---|---|---|
| 8,429,502 B2 | 4/2013 | Lakkis | |
| 8,565,330 B2 | 10/2013 | Seki | |
| 9,882,620 B2 * | 1/2018 | Guey | H04B 7/0617 |
| 2006/0018394 A1 * | 1/2006 | van Zelst | H04B 7/04 375/260 |
| 2007/0066329 A1 * | 3/2007 | Laroia | H04B 7/2678 455/502 |
| 2007/0109989 A1 * | 5/2007 | Nakagawa | H04W 84/20 370/328 |
| 2007/0111667 A1 * | 5/2007 | Kwon | H04L 25/0226 455/67.11 |
| 2007/0165728 A1 * | 7/2007 | Parizhsky | H04L 27/2607 375/260 |
| 2007/0237068 A1 * | 10/2007 | Bi | H04L 5/0048 370/208 |
| 2008/0298502 A1 * | 12/2008 | Xu | H04L 5/0007 375/299 |
| 2010/0029262 A1 * | 2/2010 | Wang | H04J 11/004 455/423 |
| 2010/0110986 A1 * | 5/2010 | Nogami | H04L 1/0027 370/328 |
| 2010/0182975 A1 * | 7/2010 | Malladi | H04L 1/1664 370/330 |
| 2010/0208834 A1 * | 8/2010 | van Zelst | H04B 7/0447 375/267 |
| 2011/0103315 A1 * | 5/2011 | Camp, Jr. | H04L 1/1854 370/329 |
| 2011/0128909 A1 * | 6/2011 | Luo | H04L 5/0023 370/328 |
| 2011/0188447 A1 * | 8/2011 | Wang | H04L 5/0053 370/328 |
| 2011/0205954 A1 * | 8/2011 | Gorokhov | H04L 5/0007 370/315 |
| 2011/0216711 A1 * | 9/2011 | Onodera | H04L 1/0026 370/329 |
| 2012/0033751 A1 * | 2/2012 | Sathananthan | H04L 25/022 375/260 |
| 2012/0063532 A1 | 3/2012 | Yoshimoto et al. | |
| 2013/0044692 A1 * | 2/2013 | Nory | H04L 5/0048 370/329 |
| 2014/0169280 A1 * | 6/2014 | Yu | H04W 72/082 370/329 |
| 2014/0255029 A1 | 9/2014 | Varanese et al. | |
| 2015/0092893 A1 * | 4/2015 | Tabet | H04L 27/2649 375/340 |
| 2015/0280954 A1 * | 10/2015 | Zhao | H04L 27/2613 370/328 |
| 2016/0087765 A1 * | 3/2016 | Guey | H04L 27/2613 370/330 |
| 2016/0192433 A1 * | 6/2016 | Deenoo | H04W 72/046 370/329 |

OTHER PUBLICATIONS

ISA/EPO, Partial International Search Report of the International Searching Authority, Int'l. App. No. PCT/US2016/035771, dated Sep. 15, 2016, European Patent Office, Rijswijk, NL, 8 pgs.

* cited by examiner

JOINT CHANNEL AND PHASE NOISE ESTIMATION IN CONTROL SYMBOLS OF A MILLIMETER WAVE LINK

CROSS REFERENCES

The present application for patent claims priority to U.S. Provisional Patent Application No. 62/187,773 by Cezanne et al., titled "Joint Channel and Phase Noise Estimation in Control Symbols of a Millimeter Wave Link," filed Jul. 1, 2015, assigned to the assignee hereof, and expressly incorporated by reference herein.

BACKGROUND

Field of the Disclosure

The present disclosure, for example, relates to wireless communication systems, and more particularly to joint channel and phase noise estimation.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Phase noise (PN) is commonly present in wireless transmissions. PN can lead to errors in channel estimation, degrade signal quality, and increase intercarrier interference among subcarriers, among other problems. Some radios, such as millimeter wave (mmW) radios, have higher phase noise levels than other radios, such as those using frequencies below 6 gigahertz (GHZ). This may be due to a higher frequency ratio between a local oscillator and a temperature compensated crystal oscillator of the radio. Such radios may also have noisier voltage control oscillators. In a downlink or uplink transmission, a user equipment (UE) may contribute a majority of the PN.

Performing channel estimation may be necessary for coherent detection of wireless transmissions. However, the channel estimate and the PN may be unknown during the reception of a control symbol. The channel estimate and the estimated PN may be used to demodulate control and data symbols.

SUMMARY

Techniques, apparatus, and systems described herein may be used to estimate a channel and phase noise (PN) in control symbols. A wireless device may generate control symbols that include both control tones and pilot tones. The control tones and the pilot tones may be arranged in the control symbols in one of several ways. Example ways of arranging the control tones and the pilot tones includes arranging each according to one or more sequences, alternating the control tones and the pilot tones, offsetting the pilot tones from the control tones, and combinations thereof. A receiving wireless device may use the pilot tones to determine a joint estimation of channel and PN.

In a first set of illustrative examples, a method for wireless communication is described. In one configuration, the method includes inserting a control tone at a first periodicity in a first subcarrier of a control symbol. The method also includes inserting a pilot tone at a second periodicity in a second subcarrier of the control symbol, the pilot tone being offset from the control tone in the control symbol. The method further includes transmitting the control symbol.

In a second set of illustrative examples, an apparatus for wireless communication is described. In one configuration, the apparatus may include a control tone module for inserting a control tone at a first periodicity in a first subcarrier of a control symbol. The apparatus may also include a pilot tone module for inserting a pilot tone at a second periodicity in a second subcarrier of the control symbol, the pilot tone being offset from the control tone in the control symbol. The apparatus may further include a transmitter for transmitting the control symbol.

In a third set of illustrative examples, another apparatus for wireless communication is described. In one configuration, the apparatus may include a processor, memory in electronic communication with the processor, and instructions stored in the memory and operable, when executed by the processor, to cause the apparatus to insert a control tone at a first periodicity in a first subcarrier of a control symbol. The instructions may, when executed by the processor, further cause the apparatus to insert a pilot tone at a second periodicity in a second subcarrier of the control symbol, the pilot tone being offset from the control tone in the control symbol. The instructions may, when executed by the processor, further cause the apparatus to transmit the control symbol.

In a fourth set of illustrative examples, a non-transitory computer-readable medium storing computer-executable code for wireless communication is described. In one configuration, the computer-executable code may be executable by a processor to cause a wireless device to insert a control tone at a first periodicity in a first subcarrier of a control symbol and insert a pilot tone at a second periodicity in a second subcarrier of the control symbol, the pilot tone being offset from the control tone in the control symbol. The computer-executable code may be further executable by the processor to cause the wireless device to transmit the control symbol.

The method, apparatuses, and non-transitory computer-readable medium may include additional features. In some examples, inserting the pilot tone at the second periodicity further includes inserting the pilot tone every $n^{th}$ subcarrier. In some example, n is a value greater than one. The variable n may be determined based at least in part on a channel delay spread, a phase noise level, a channel noise level, or combinations thereof.

In some examples, the method, apparatuses, and non-transitory computer-readable medium may further include determining the offset based at least in part on one or both of a channel delay spread and a phase noise level. In some examples, the offset comprises four subcarriers. The first periodicity may be equal to the second periodicity. In some examples, the first periodicity and the second periodicity are every eight tones in a frequency domain of the control symbol.

The control symbol may include alternating control tones and pilot tones separated by unoccupied subcarriers. Some examples may include determining a phase of a series of pilot tones based at least in part on a pseudo-noise sequence or a Zadoff-Chu sequence. Some examples may include determining a phase of a series of the pilot tones based at least in part on a user equipment (UE) identification (ID), a cell ID, a beam ID, or combinations thereof. Some examples include precoding control information for the control tone with a discrete Fourier transform.

In some examples, transmitting the control symbol further includes transmitting the control tone at a higher power than the pilot tone. Some examples may include transmitting at least two control symbols in a sub-frame, wherein the frequency of transmitting the at least two control symbols is based at least in part on a velocity of a wireless device and a frequency of channel change. In some examples, the at least two control symbols includes a symbol that includes only pilot tones and null tones. The wireless device may include a millimeter wave (mmW) radio. In some examples, transmitting the control symbol further includes transmitting the control symbol within a mmW radio spectrum frequency.

In a fifth set of illustrative examples, a method for wireless communication is described. In one configuration, the method includes receiving a control symbol comprising a control tone at a first periodicity, and a pilot tone at a second periodicity, the pilot tone being offset from the control tone in the control symbol. The method also includes performing a phase noise estimation and a channel estimation from the pilot tone.

In a sixth set of illustrative examples, an apparatus for wireless communication is described. In one configuration, the apparatus may include a receiver for receiving a control symbol comprising a control tone at a first periodicity, and a pilot tone at a second periodicity, the pilot tone being offset from the control tone in the control symbol. The apparatus may also include an estimation component for performing a phase noise estimation and a channel estimation from the pilot tone.

In a seventh set of illustrative examples, another apparatus for wireless communication is described. In one configuration, the apparatus may include a processor, memory in electronic communication with the processor, and instructions stored in the memory and operable, when executed by the processor, to cause the apparatus to receive a control symbol comprising a control tone at a first periodicity, and a pilot tone at a second periodicity, the pilot tone being offset from the control tone in the control symbol. The instructions may, when executed by the processor, further cause the apparatus to perform a phase noise estimation and a channel estimation from the pilot tone.

In an eighth set of illustrative examples, a non-transitory computer-readable medium storing computer-executable code for wireless communication is described. In one configuration, the computer-executable code may be executable by a processor to cause a wireless device to receive a control symbol comprising a control tone at a first periodicity, and a pilot tone at a second periodicity, the pilot tone being offset from the control tone in the control symbol. The computer-executable code may be further executable by the processor to cause the wireless device to perform a phase noise estimation and a channel estimation from the pilot tone.

The method, apparatuses, and non-transitory computer-readable medium may include additional features. Some examples include determine control information from the control tone, wherein determining control information is based at least in part on channel and phase noise estimation.

Performing the phase noise estimation and the channel estimation may further include compensating the control symbol based on the phase noise estimation and performing the channel estimation based on the compensated phase noise.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Channel and phase noise (PN) may be estimated from control symbols that include pilot tones as well as control tones. A wireless device, such as a base station, may generate a control symbol that includes both control tones and pilot tones. The control tones and the pilot tones may be arranged in the control symbols according to a first and second periodicity, respectively. In some examples, the first and second periodicities may be the same with an offset between the control tones and the pilot tones. A receiving wireless device, such as a user equipment (UE), may use the pilot tones to determine a joint estimation of channel and PN.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
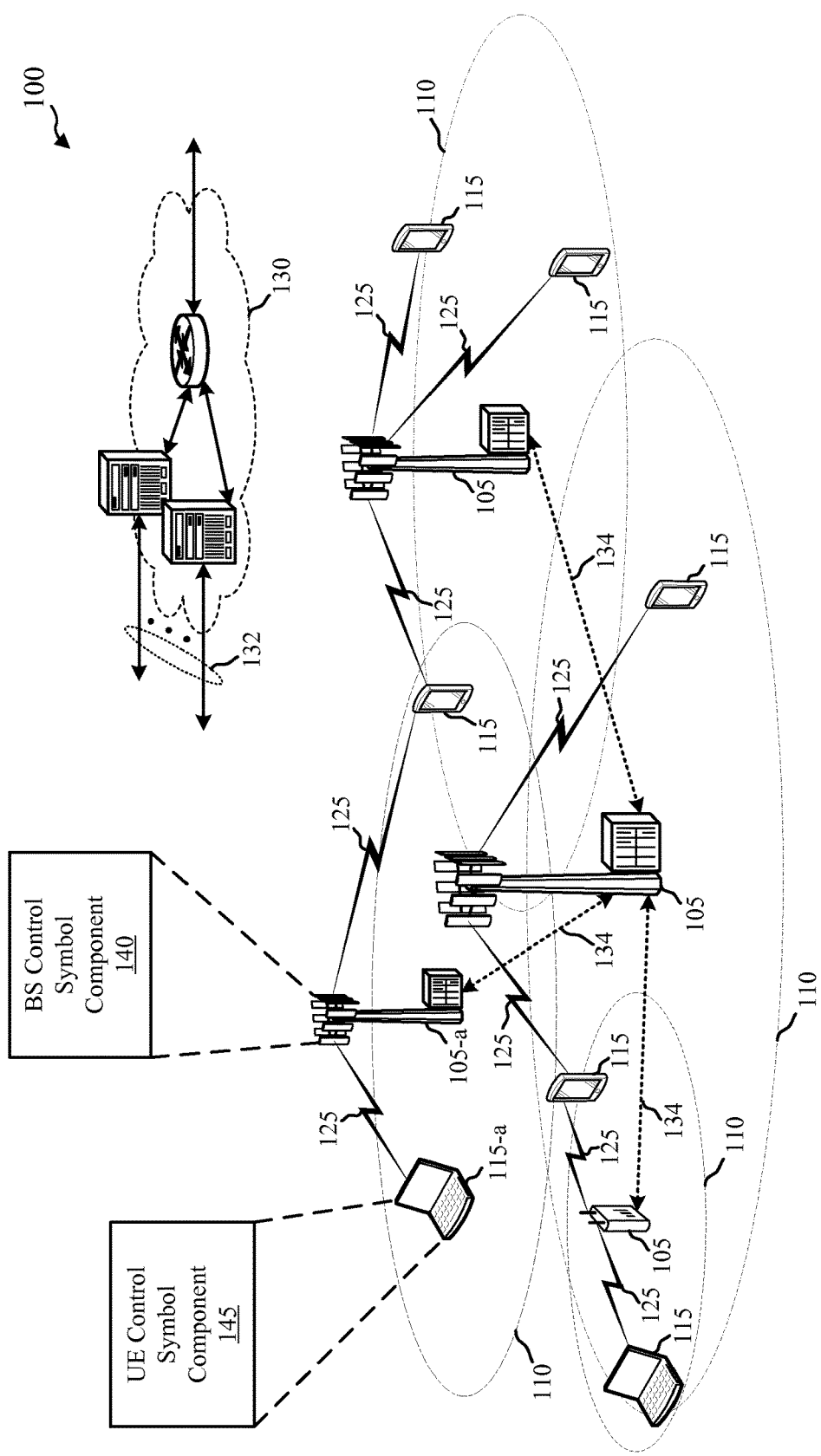
FIG. 1 illustrates an example of a wireless communications system that supports joint channel and phase noise estimation in accordance with various aspects of the present disclosure.

FIG. 1 illustrates an example of a wireless communications system 100 in accordance with various aspects of the disclosure. The wireless communications system 100 includes base stations 105, user equipment (UEs) 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller. In various examples, the base stations 105 may communicate, either directly or indirectly (e.g., through core network 130), with each other over backhaul links 134 (e.g., X1, etc.), which may be wired or wireless communication links. In some examples, the wireless communications system 100 may have protocols similar to that of a Long Term Evolution (LTE)/LTE-advanced (LTE-a) wireless network or a millimeter-wave based wireless network. In some examples, the wireless communications system 100 may be a millimeter-wave based wireless network.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area. The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. A UE 115 may be configured with multiple downlink CCs and one or more uplink CCs for carrier aggregation. Carrier aggregation may be used with both FDD and TDD component carriers.

A base station, such as BS 105-a, may include a BS control symbol component 140. The BS control symbol component 140 may generate one or more control symbols for transmission according to techniques described herein. The BS control symbol component 140 may also estimate channel and phase noise from a received control symbol that includes pilot tones as well as control tones. Similarly, a wireless device, such as UE 115-a, may include a UE control symbol component 145. The UE control symbol component 145 may function similarly to the BS control symbol component 140. However, for illustrative purposes, the examples included herein mainly describe a BS 105 generating the control symbols and the UE 115 estimating the channel and PN from the control symbols. However, it is to be understood that either the BS 105 or the UE 115 may generate or interpret control symbols.

Therefore, techniques described herein design a symbol that conveys control information which allows a receiver to estimate the channel profile in the presence of phase noise and additive channel noise. The symbol may be used for an airlink that uses a cyclic prefix (e.g., OFDM, single-carrier FDMA (SC-FDM), single-carrier cyclic prefix (SCCP), etc.).

Figure 2:
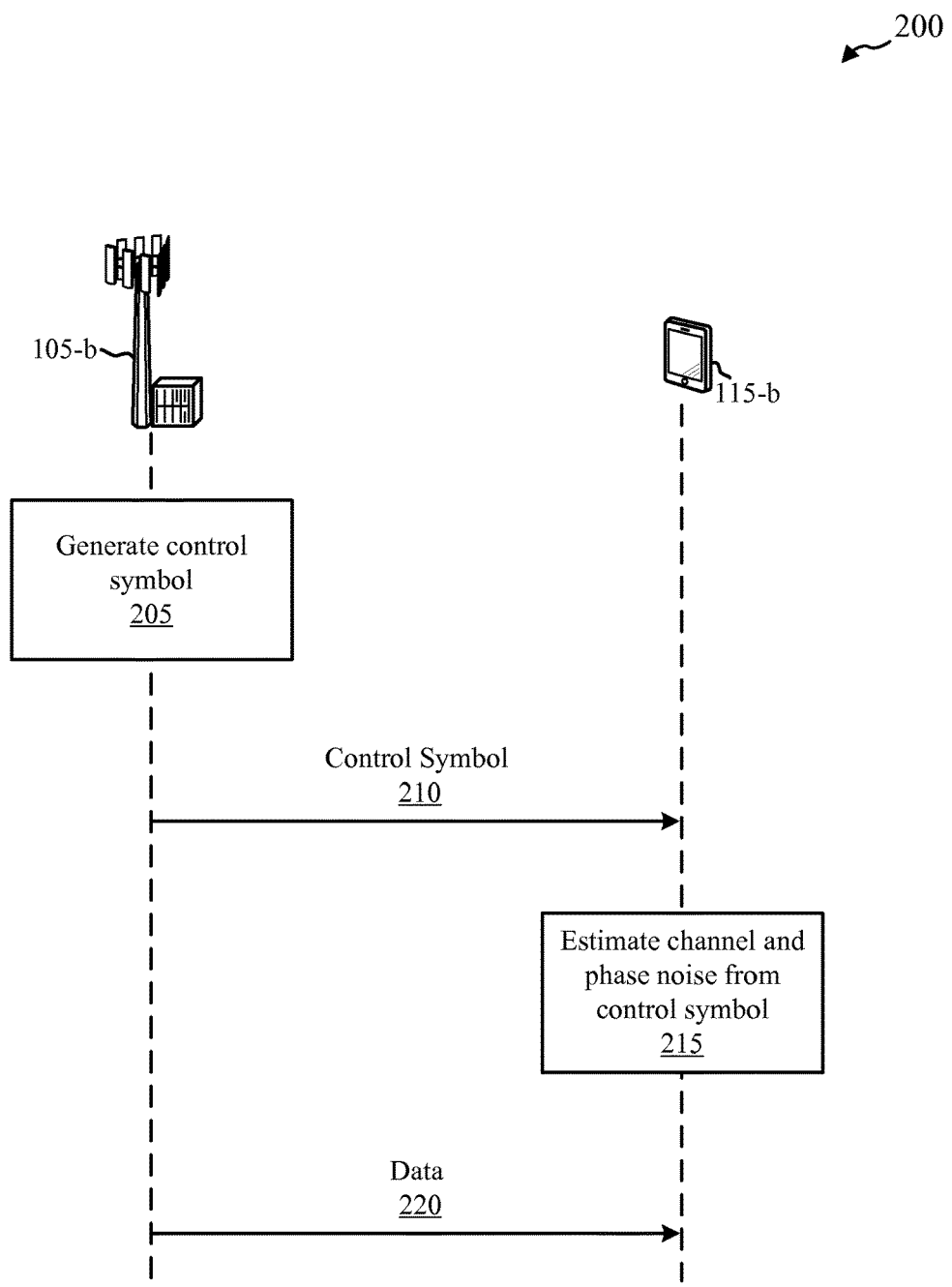
FIG. 2 shows a flow diagram illustrating example channel and phase noise (PN) estimation in a wireless communication system, in accordance with various aspects of the present disclosure.

FIG. 2 shows a flow diagram illustrating example channel and PN estimation in a wireless communications system 200, in accordance with various aspects of the present disclosure. The wireless communications system 200 may include a UE 115-b and BS 105-b, which may be examples of a UE 115 and base station 105 described with reference to FIG. 1.

Before the UE 115-b performs channel and PN estimation, the BS 105-b may send directional primary synchronization signals in different directions. The UEs within a cell of the BS 105-b, for example the UE 115-b, may feedback a best direction to the BS 105-b. The BS 105-b may then schedule a set of UEs that will receive downlink traffic.

In order for the UE 115-b to jointly estimate channel and PN, the BS 105-b may generate a control symbol (205). The BS 105-b may include pilot tones and control tones in the control symbol. The BS 105-b may also generate multiple control symbols.

The BS 105-b may transmit the control symbol 210 to the UE 115-b. Upon receiving the control symbol 210, the UE 115-b may estimate the channel and PN from the control symbol 210 (215). The BS 105-b may transmit data 220 to the UE 115-b. The BS 105-b may use OFDMA or SC-FDMA, for example. The UE 115-b may use the estimated channel and PN for coherent detection of the data 220.

Figure 3:
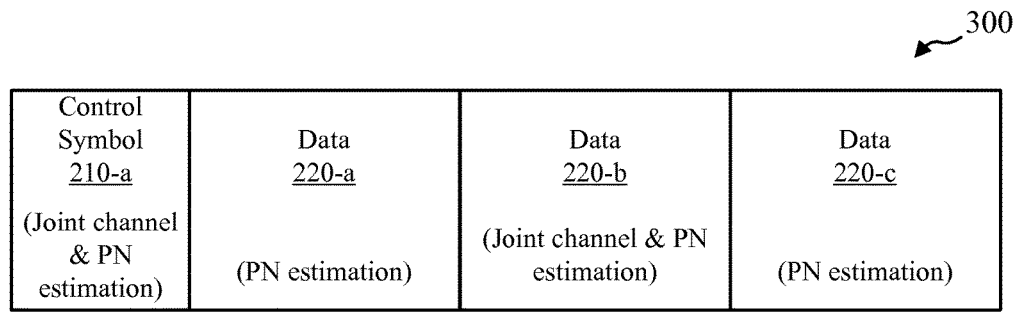
FIG. 3 illustrates an example sub-frame structure that supports joint channel and phase noise estimation in accordance with various aspects of the present disclosure.

FIG. 3 illustrates an example sub-frame 300 structure that supports joint channel and phase noise estimation in accordance with various aspects of the present disclosure. The sub-frame 300 may include a control symbol 210-a, which may be examples of the control symbol 210 described with reference to FIG. 2. The sub-frame 300 may also include one or more data symbols, such as data symbols 220-a, 220-b, and 220-c which may be examples of the data symbol 220 described with reference to FIG. 2.

In some examples, the sub-frame 300 may have 33 symbols and a 125 microsecond (μs) duration. The sub-frame 300 illustrates only a single UE allocation per sub-frame, but in other examples, two or more UEs may be multiplexed in a time domain.

The first symbol may be the control symbol 210-a which transmits control information (e.g., scheduling, modulation and coding scheme (MCS) information, etc.). The control symbol 210-a may include control tones that contain the control information. The control information may be pre-coded (e.g., with a discrete Fourier transform) and corresponding control tones may be inserted in the control symbol with a periodicity. In one example, the periodicity is every $8^{th}$ tone in the frequency domain. The control symbol may also include pilot tones for joint channel and PN estimation. The pilot tones may be encoded into the control symbol with a second periodicity, which may be the same or different than the periodicity of the control tones. In some examples, the periodicity of the pilot tones may be an integer multiple of the periodicity of the control tones. In examples where the chosen periodicities cause the pilot tones and the control tones to collide, the control tone sequence may be punctured (e.g., colliding control tones may not be used). The control tones and the pilot tones may be offset from each other.

As phase noise may vary quickly in time, PN mitigation pilot tones may be included in every symbol. Also, two or more channel estimation symbols may be included among the 33 symbols of the sub-frame 300. Thus, the data 220-*a* may include pilot tones for PN estimation. The data 220-*b* may include a control symbol that has pilot tones and control tones for joint channel and PN estimation. The data 220-*c* may include pilot tones for PN estimation.

Figure 4:
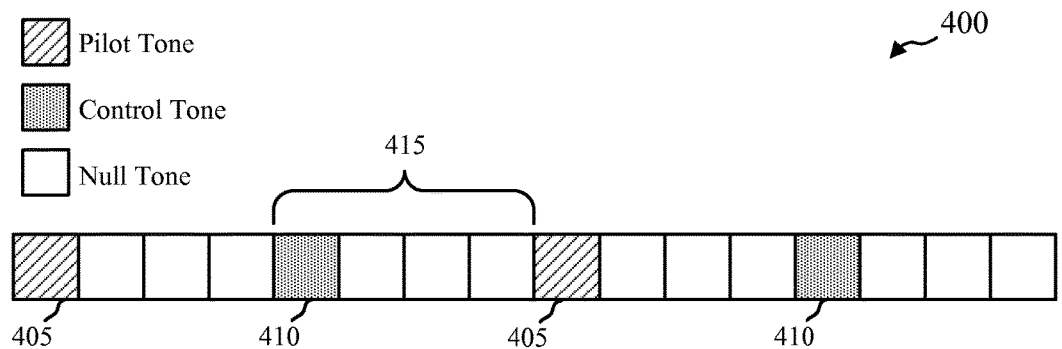
FIG. 4 illustrates an example control symbol structure in accordance with various aspects of the present disclosure.

FIG. 4 illustrates an example control symbol 400 structure in accordance with various aspects of the present disclosure. The illustration of the control symbol 400 represents tones in a frequency domain. The control symbol 400 may be an example of the control symbol 210 described with reference to FIGS. 2 and 3.

The control symbol 400 includes control tones 410. The control tones 410 contain control information. To enable the control symbol 400 to be used for joint channel and PN estimation, the control symbol 400 also includes pilot tones 405. The control symbol 400 may have null tones (i.e., no tone or information) between the control tones 410 and the pilot tones 405. A receiver of the control symbol 400 may use the pilot tones 405 to jointly estimate channel and PN. Any occupied subcarrier in the control symbol 400 contains either a control tone or a pilot tone.

In the example of FIG. 4, the control tones 410 are located at every eighth tone in the frequency domain. Thus the periodicity of inserting the control tones 410 may be one in every eight tones. The pilot tones 405 may also be located in the control symbol 400 with a periodicity, which in this example is also one in every eighth tone. The pilot tones 405 may be separated by the control tones 410 by an offset 415. In this example, the offset 415 is four tones. The offset 415 may depend on a phase noise level, a channel delay spread, or combinations thereof. The example of FIG. 4 may handle a 300 nanosecond delay spread.

In other examples, other periodicities may be used for the pilot tones 405 and/or control tones 410. Over one period length (e.g., eight tones in the example of FIG. 4), the channel may not vary much. However, if the channel varies faster, the period length of the pilot tones 405 may be shortened. On the other hand, the PN may spill spectral power from the pilot tones and control tones to their respective neighboring tones. To keep this mutual interference small, in some examples the offset 450 may not be shortened below a selected limit. Some periodicities may be one in every seven or nine tones, for example, while other periodicities may be used in other examples. In some examples, the periodicity may be dependent on a power spectrum of the phase noise.

The phase of the pilot tones 405 may be modulated according to a known sequence. The sequence may be a Zadoff-Chu sequence, a gold sequence, or any other suitable sequence. This sequence may be a reference sequence of pilot tones. With r(m) denoting the transmitted sequence with m denoting the index, r(m) may map to a complex valued modulation symbol $a_k$, used as a pilot tone, according to Equation 1.

$$a_k = r(m) \tag{1}$$

The variable k, referring to the tone location in an OFDM symbol, may be given as in Equation 2 and the variable m as in Equation 3.

$$k = 8m \tag{2}$$

$$m = 0, 1, \ldots, \frac{N_{RB}^{DL} N_{SC}^{RB}}{8} - 1 \tag{3}$$

Here, $N_{RB}^{DL}$ may denote a number of resource blocks in the downlink. $N_{SC}^{RB}$ may denote the number of subcarriers per resource block.

The location of the control tones may be defined. The variable $b_k$ denotes the transmitted tones that contain control information, the control tones may be located according to Equations 4 and 3.

$$k = 8m + 4 \tag{4}$$

In this example, the control or pilot tones are transmitted after every four subcarriers. The overall sequence may generate time domain periodicity with a period length of 2048 divided by four, which is 512 samples. The receiver (e.g., UE 115) may get four periods of a time domain sequence where each period is multiplied with different phase noise. The UE 115 may measure an average phase difference between those received periods. This may yield a coarse estimation of the phase noise trajectory with a time resolution of 512 samples. If the power of the control tones is kept small relative to the power of the pilot tones, the UE 115 may estimate phase noise with a resolution of 256 samples based on this example periodicity. Lower resolutions may be achieved with algorithms of higher computational complexity. The UE 115 may estimate the channel after compensating for the phase noise.

A frequency of joint channel and PN estimation symbols in the time domain may vary in different examples. A number of control symbols per subframe may depend on a velocity of the receiving wireless device, a frequency of channel change, or combinations thereof. In one example, a symbol containing joint channel and PN estimation pilot is inserted every 62.5 µs for each UE. The relationship between the channel correlation and UE speed may be approximated by Clarke's model. Some examples handle approximately a speed of 300 kilometers per hour (km/hr).

The transmit power may be split between data and pilot tones. Phase noise may leak the contents of one town into a neighboring tone. If control tones have too much power, they may corrupt the content of one or more pilot tones due to the phase noise. On the other hand, control tones need to have sufficient power so that the receiver may demodulate them. Thus, the transmitter may allocate power among the control tones and the pilot tones to reduce this problem.

Further, a pilot sequence may have identification information embedded in it. For example, cell identification (ID) may be embedded in the pilot sequence so that the receiving wireless device can measure the interference from neighboring base stations. Alternatively, a beam ID may be embedded in the pilot sequence so that the receiving wireless device can decipher the beam ID that an interfering BS is using. In some examples, the pilot sequence includes the cell ID and the beam ID.

Figure 5:
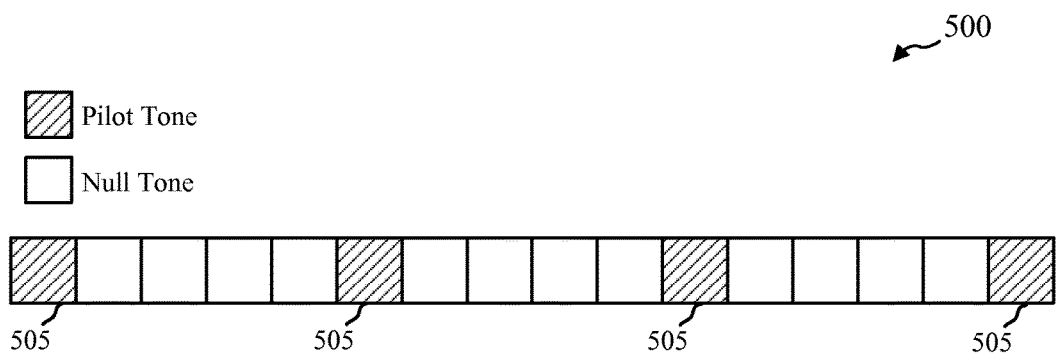
FIG. 5 illustrates another example control symbol structure in accordance with various aspects of the present disclosure.

FIG. 5 illustrates another example control symbol 500 structure in accordance with various aspects of the present disclosure. The illustration of the control symbol 500 represents tones in a frequency domain. The control symbol 500 may be an example of the control symbol 210 described with reference to FIGS. 2 and 3.

The control symbol 500 may include pilot tones 505. The pilot tones 505 may have a periodicity of five tones. A control symbol such as the control symbol 500 that only contains pilot tones may be occasionally transmitted. The frequency of transmitting such control symbols 500 may depend on a velocity of the wireless device and a frequency of channel change, or combinations thereof.

Figure 6:
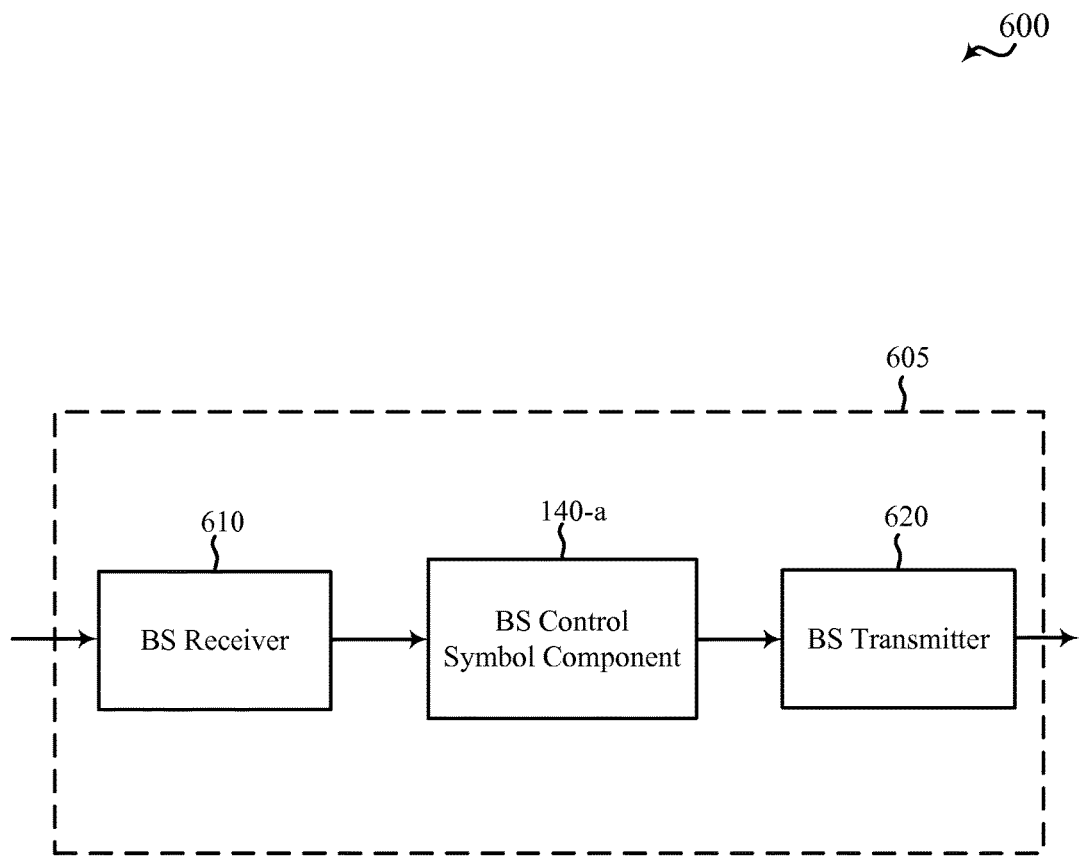
FIG. 6 shows a block diagram of an example wireless device that supports joint channel and phase noise estimation in accordance with various aspects of the present disclosure.

FIG. 6 shows a block diagram 600 of an example wireless device 605 that supports joint channel and phase noise estimation in accordance with various aspects of the present disclosure. Wireless device 605 may be an example of aspects of a base station 105 described with reference to FIGS. 1 and 2. Wireless device 605 may include a BS receiver 610, a BS control symbol component 140-a, or a BS transmitter 620. Wireless device 605 may also include a processor. Each of these components may be in communication with each other.

The BS receiver 610 may receive information such as packets, user data, or control information associated with various information channels (e.g., control channels, data channels, and information related to joint channel and phase noise estimation, etc.). Information may be passed on to the BS control symbol component 140-a, and to other components of the wireless device 605.

The BS control symbol component 140-a may generate one or more control symbols that enable joint channel and phase noise estimation. The BS control symbol component 140-a may insert a control tone at a first periodicity in a first subcarrier of a control symbol and insert a pilot tone at a second periodicity in a second subcarrier of the control symbol, the pilot tone being offset from the control tone in the control symbol. The BS control symbol component 140-a may provide the generated control symbol to the BS transmitter 620.

The BS transmitter 620 may transmit signals received from other components of the wireless device 605. For example, the BS transmitter 620 may transmit control symbols. In some examples, the BS transmitter 620 may be collocated with the BS receiver 610 in a transceiver module. The BS transmitter 620 may include a single antenna, or it may include a plurality of antennas.

Figure 7:
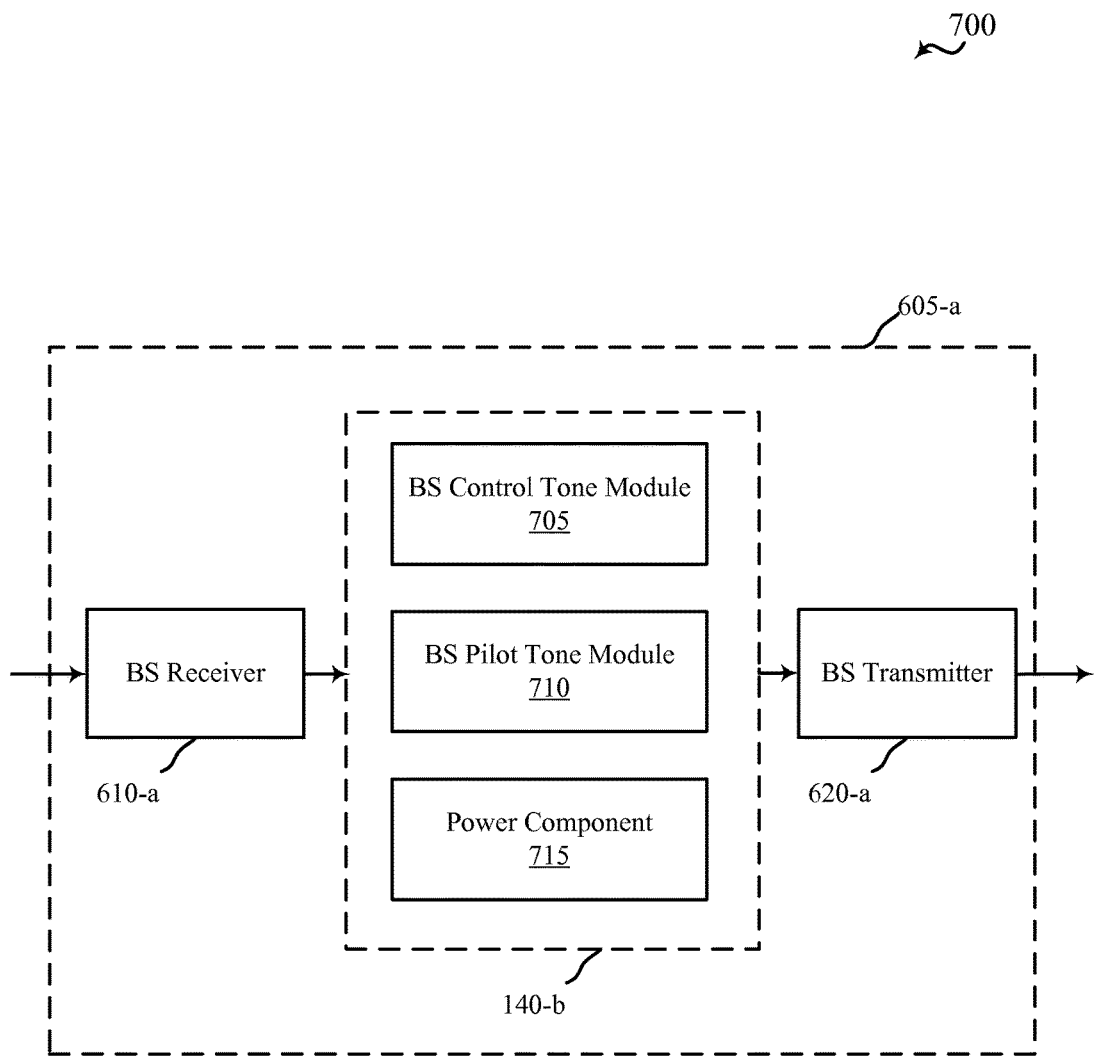
FIG. 7 shows a block diagram of another example wireless device that supports joint channel and phase noise estimation in accordance with various aspects of the present disclosure.

FIG. 7 shows a block diagram of another example wireless device 605-a that supports joint channel and phase noise estimation in accordance with various aspects of the present disclosure. The wireless device 605-a may be an example of aspects of a wireless device 605 or a BS 105 described with reference to FIGS. 1, 2, and 6. The wireless device 605-a may include a BS receiver 610-a, a BS control symbol component 140-b, or a BS transmitter 620-a. The wireless device 605-a may also include a processor. Each of these components may be in communication with each other. The BS control symbol component 140-b may also include a BS control tone module 705, a BS pilot tone module 710, and a power component 715.

The BS receiver 610-a may receive information which may be passed on to BS control symbol component 140-b, and to other components of wireless device 605-a. The BS control symbol component 140-b may perform the operations described with reference to FIG. 6. The BS transmitter 620-a may transmit signals received from other components of the wireless device 605-a.

The BS control tone module 705 may insert a control tone at a first periodicity in a first subcarrier of a control symbol as described with reference to FIGS. 1-6. The BS control tone module 705 may also precode control information for the control tone with a discrete Fourier transform.

The BS pilot tone module 710 may insert a pilot tone at a second periodicity in a second subcarrier of the control symbol, the pilot tone being offset from the control tone in the control symbol as described with reference to FIGS. 1-6. In some examples, inserting the pilot tone at the second periodicity further includes inserting the pilot tone every $n^{th}$ subcarrier. In some examples, n is a value greater than one. In some examples, the at least two control symbols includes one symbol that consists of only pilot tones and null tones. The BS pilot tone module 710 may also determine a phase of a series of pilot tones based at least in part on a pseudo-noise sequence or a Zadoff-Chu sequence. The BS pilot tone module 710 may also determine a phase of a series of pilot tones based at least in part on a UE ID and a beam ID.

The power component 715 may transmit the control tone at a lower power than the pilot tone as described with reference to FIG. 4.

The BS transmitter 620-a may transmit the control symbol as described with reference to FIGS. 1-6. The BS transmitter 620-a may also transmit at least two control symbols in a sub-frame, wherein the frequency of transmitting the at least two control symbols is based at least in part on a velocity of a wireless device and a frequency of channel change. The BS transmitter 620-a may also transmit the control symbol within a millimeter wave (mmW) radio spectrum frequency. In some examples, the BS transmitter 620-a is a mmW device.

Figure 8:
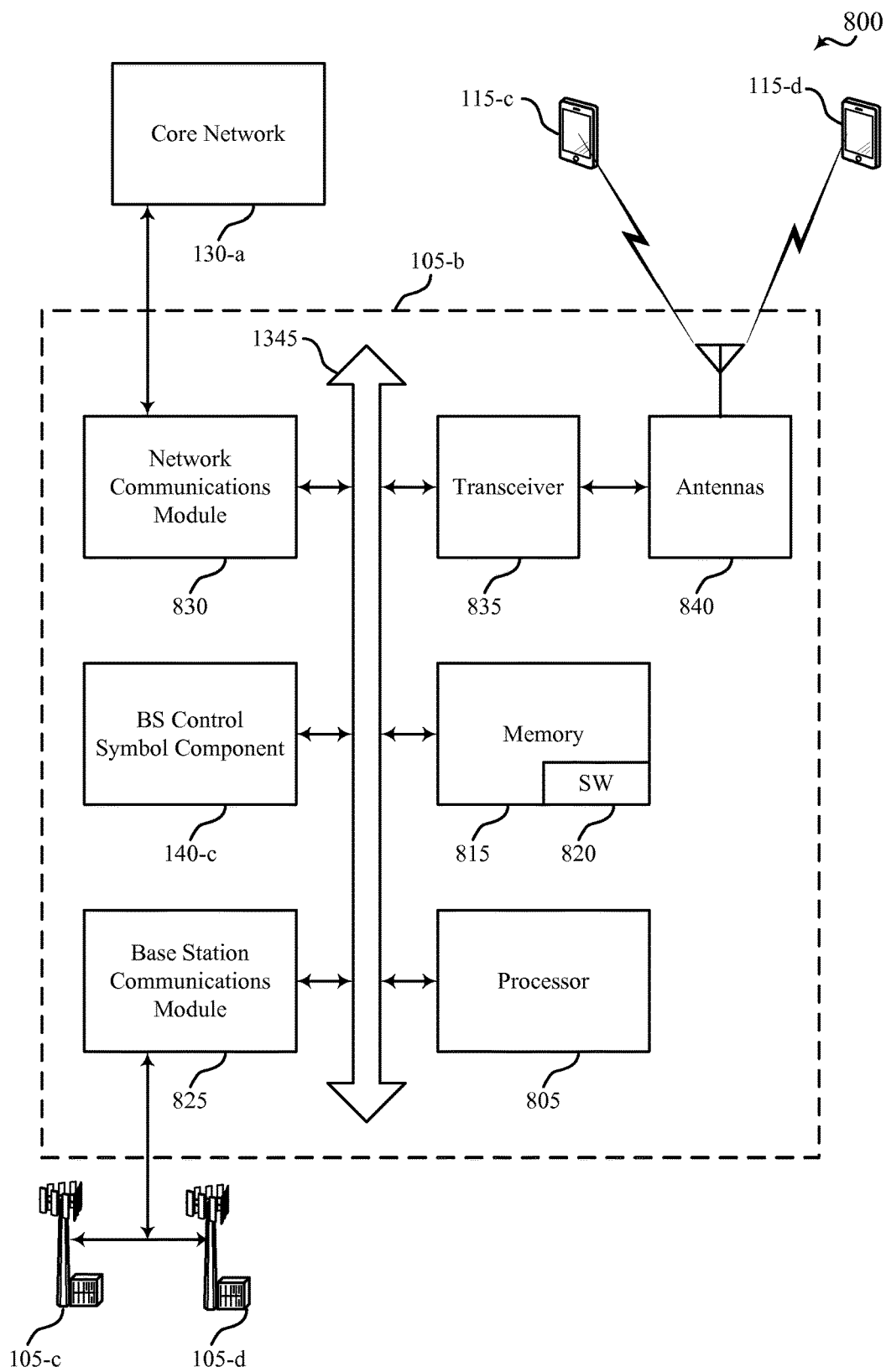
FIG. 8 illustrates a block diagram of a system including a base station that supports joint channel and phase noise estimation in accordance with various aspects of the present disclosure.

FIG. 8 illustrates a block diagram of a system 800 including a BS 105-b that supports joint channel and phase noise estimation in accordance with various aspects of the present disclosure. System 800 may include BS 105-b, which may be an example of a wireless device 605 or a base station 105 described with reference to FIGS. 1, 2, and 6-7. The BS 105-b may include a BS control symbol component 140-c, which may be an example of a BS control symbol component 140 described with reference to FIGS. 1 and 6-7. The BS 105-b may also include components for bi-directional voice and data communications including components for transmitting communications and components for receiving communications. For example, BS 105-b may communicate bi-directionally with UE 115-c or UE 115-d.

In some cases, the BS 105-b may have one or more wired backhaul links. The BS 105-b may have a wired backhaul link (e.g., S1 interface, etc.) to the core network 130. The BS 105-b may also communicate with other BSs 105, such as BS 105-c and base station 105-d via inter-base station backhaul links (e.g., an X2 interface). Each of the BSs 105 may communicate with UEs 115 using the same or different wireless communications technologies. In some cases, BS 105-b may communicate with other base stations such as 105-c or 105-d utilizing base station communications module 825. In some examples, base station communications module 825 may provide an X2 interface similar to that of a Long Term Evolution (LTE)/LTE-A wireless communication network technology to provide communication between some of the base stations 105. In some examples, the BS 105-b may communicate with other BSs 105 through the core network 130. In some cases, the BS 105-b may communicate with the core network 130 through network communications module 830.

The BS 105-b may include a processor 805, memory 815 (including software (SW) 820), transceiver 835, and antenna(s) 840, which each may be in communication, directly or indirectly, with one another (e.g., over bus system 845). The transceivers 835 may be configured to communicate bi-directionally, via the antenna(s) 840, with the UEs 115, which may be multi-mode devices. The transceiver 835 (or other components of the BS 105-*b*) may also be configured to communicate bi-directionally, via the antennas 840, with one or more other BSs. The transceiver 835 may include a modem configured to modulate the packets and provide the modulated packets to the antennas 840 for transmission, and to demodulate packets received from the antennas 840. The BS 105-*b* may include multiple transceivers 835, each with one or more associated antennas 840. The transceiver 835 may be an example of a combined receiver 610 and transmitter 620 of FIGS. 6 and 7.

The memory 815 may include RAM and ROM. The memory 815 may also store computer-readable, computer-executable software code 820 containing instructions that are configured to, when executed, cause the processor 805 to perform various functions described herein (e.g., joint channel and phase noise estimation, selecting coverage enhancement techniques, call processing, database management, message routing, etc.). Alternatively, the software 820 may not be directly executable by the processor 805 but be configured to cause the computer (e.g., when compiled and executed) to perform functions described herein. The processor 805 may include an intelligent hardware device, e.g., a CPU, a microcontroller, an ASIC, and the like. The processor 805 may include various special purpose processors such as encoders, queue processing modules, base band processors, radio head controllers, digital signal processor (DSPs), and the like.

The BS communications module 825 may manage communications with other BSs 105. In some cases, a communications management module may include a controller or scheduler for controlling communications with UEs 115 in cooperation with other base stations 105. For example, the base station communications module 825 may coordinate scheduling for transmissions to UEs 115 for various interference mitigation techniques such as beamforming or joint transmission.

Figure 9:
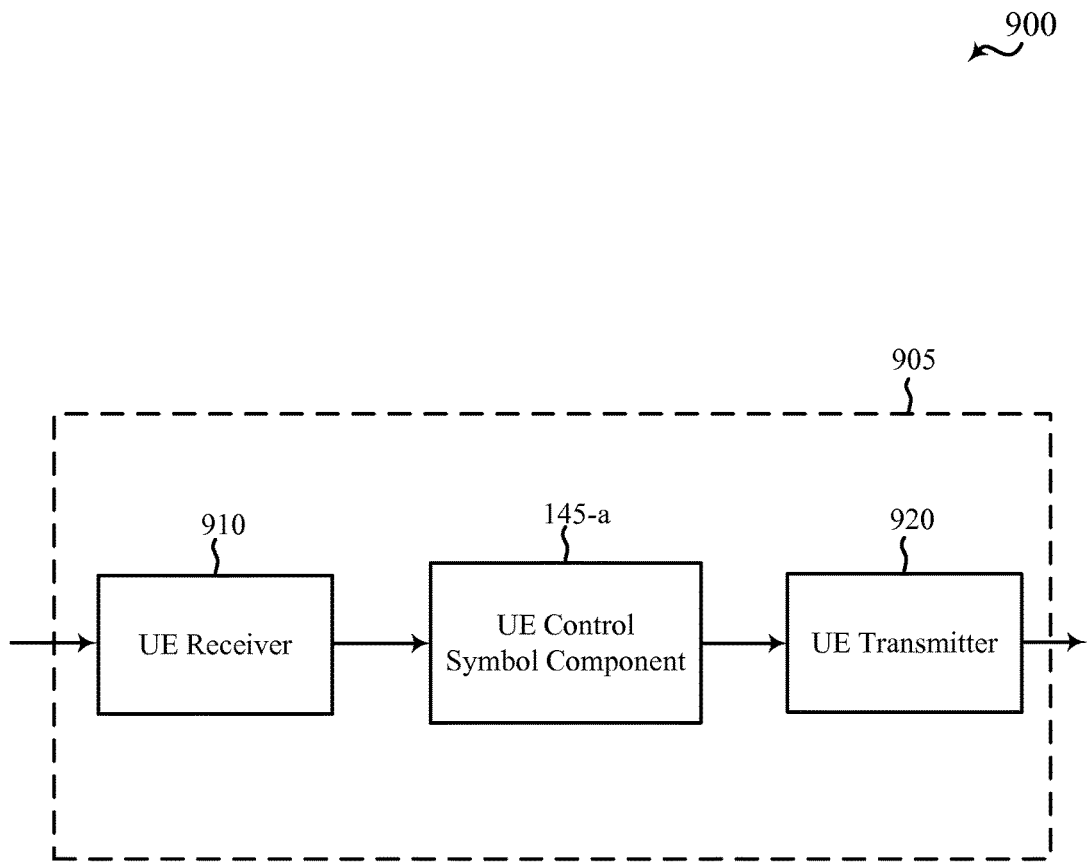
FIG. 9 shows a block diagram of an example wireless device that supports joint channel and phase noise estimation in accordance with various aspects of the present disclosure.

FIG. 9 shows a block diagram 900 of an example wireless device 905 that supports joint channel and phase noise estimation in accordance with various aspects of the present disclosure. The wireless device 905 may be an example of aspects of a UE 115 described with reference to FIGS. 1 and 2. The wireless device 905 may include a UE receiver 910, a control symbol component 145-*a*, or a transmitter 920. Wireless device 905 may also include a processor. Each of these components may be in communication with each other.

The UE receiver 910 may receive information such as packets, user data, or control information associated with various information channels (e.g., control channels, data channels, and information related to joint channel and phase noise estimation, etc.). Information may be passed on to the UE control symbol component 145-*a*, and to other components of the wireless device 905.

The UE control symbol component 145-*a* may receive a control symbol comprising a control tone at a first periodicity, and a pilot tone at a second periodicity, the pilot tone being offset from the control tone in the control symbol. The UE control symbol component 145-*a* may also perform a phase noise estimation and a channel estimation from the pilot tone.

The UE transmitter 920 may transmit signals received from other components of wireless device 905. In some examples, the UE transmitter 920 may be collocated with the UE receiver 910 in a transceiver module. The UE transmitter 920 may include a single antenna, or it may include a plurality of antennas.

Figure 10:
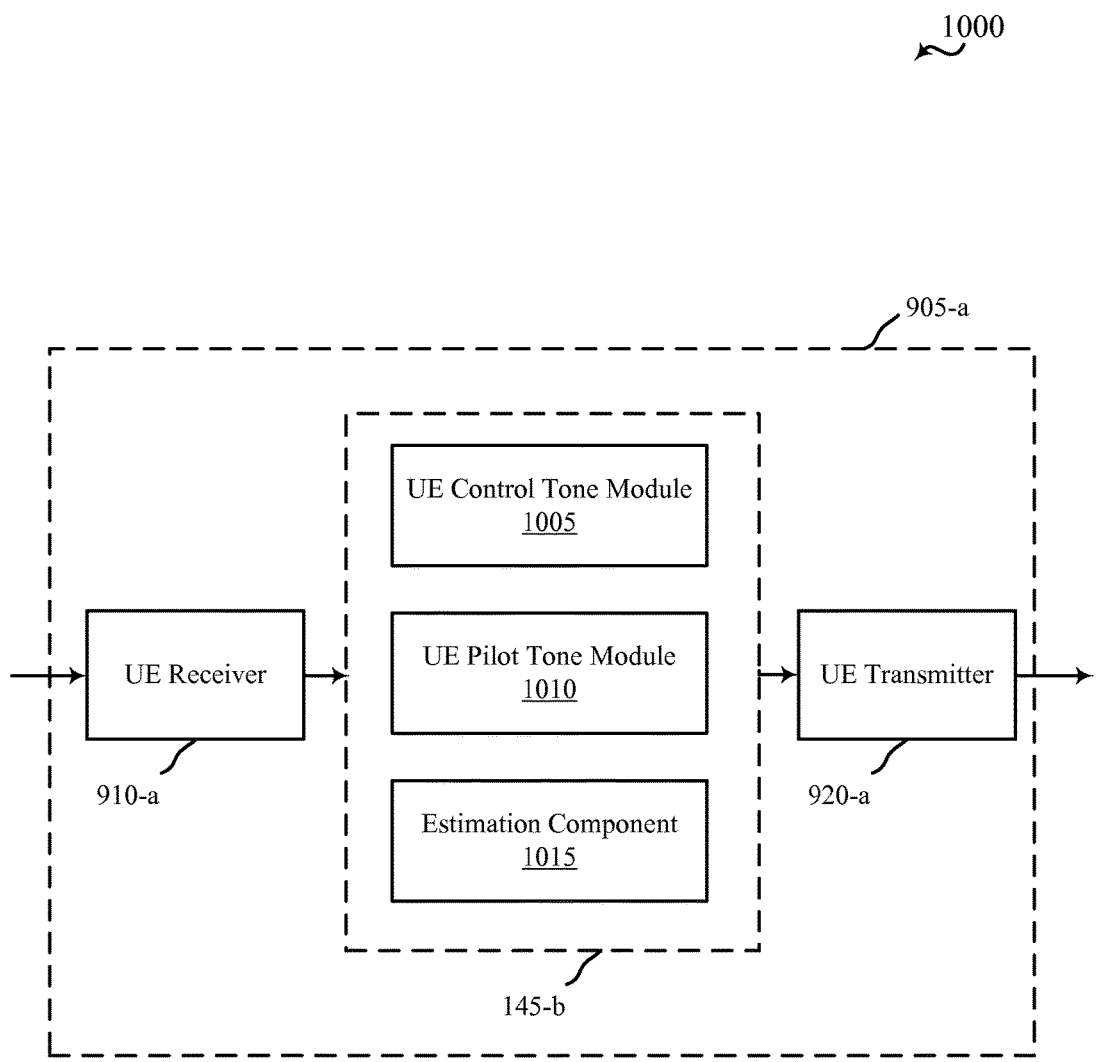
FIG. 10 shows a block diagram of another example wireless device that supports joint channel and phase noise estimation in accordance with various aspects of the present disclosure.

FIG. 10 shows a block diagram 1000 of another example wireless device 905-*a* that supports joint channel and phase noise estimation in accordance with various aspects of the present disclosure. Wireless device 905-*a* may be an example of aspects of a wireless device 905 or a UE 115 described with reference to FIGS. 1, 2, and 9. The wireless device 905-*a* may include a UE receiver 910-*a*, a UE control symbol component 145-*b*, or a UE transmitter 920-*a*. The wireless device 905-*a* may also include a processor. Each of these components may be in communication with each other. The UE control symbol component 145-*b* may also include a UE control tone module 1005, a UE pilot tone module 1010, and an estimation component 1015. In some examples, the wireless device comprises a millimeter wave (mmW) radio.

The UE receiver 910-*a* may receive information which may be passed on to UE control symbol component 145-*b*, and to other components of the wireless device 905-*a*. The UE control symbol component 145-*b* may perform the operations described with reference to FIG. 9. The UE transmitter 920-*a* may transmit signals received from other components of the wireless device 905-*a*.

The UE control tone module 1005 may interpret control tones included in a received control symbol such as the control symbol as described with reference to FIGS. 2-5. That is, the UE control tone module 1005 may determine control information from the control tones. The UE pilot tone module 1010 may interpret pilot tones included in a received control symbol as described with reference to FIGS. 2-5. The UE pilot tone module 1010 may also determine a phase of a series of pilot tones based at least in part on a UE identification (ID) and a beam ID.

The estimation component 1015 may estimate the phase noise from received control symbols as described with reference to FIGS. 2-5. After the phase noise compensation, the estimation component 1015 may also perform the channel estimation. The estimation component 1015 then determines the control information.

Figure 11:
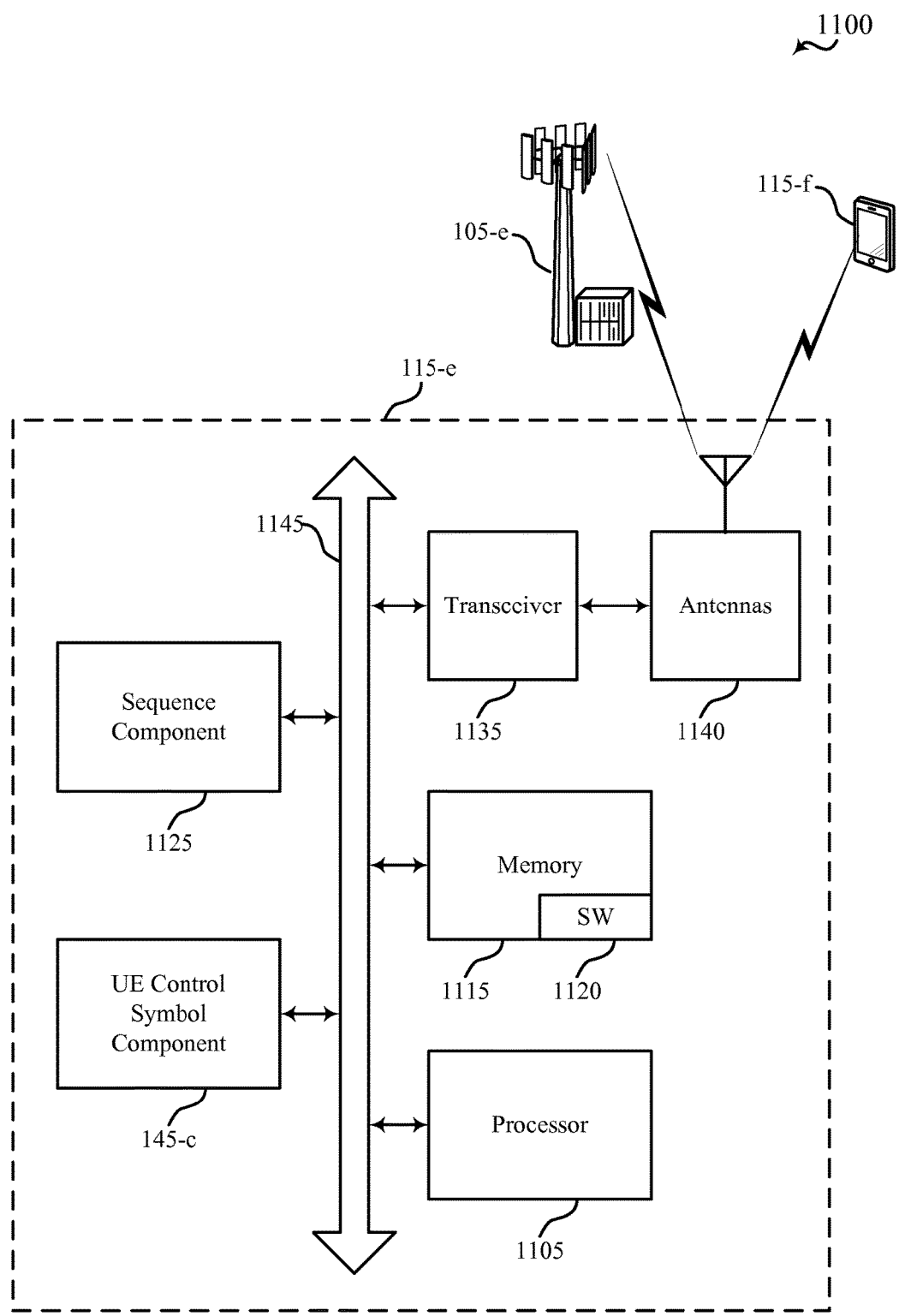
FIG. 11 illustrates a block diagram of a system including a user equipment (UE) that supports joint channel and phase noise estimation in accordance with various aspects of the present disclosure.

FIG. 11 illustrates a block diagram of a system 1100 including a UE 115-*e* that supports joint channel and phase noise estimation in accordance with various aspects of the present disclosure. The system 1100 may include UE 115-*e*, which may be an example of a wireless device 905 or a UE 115 described with reference to FIGS. 1, 2, 9, and 10. The UE 115-*e* may include a UE control symbol component 145-*c*, which may be an example of a control symbol component 145 described with reference to FIGS. 1, 9, and 10. The UE 115-*e* may also include components for bi-directional voice and data communications including components for transmitting communications and components for receiving communications. For example, UE 115-E may communicate bi-directionally with UE 115-*f* or BS 105-*e*.

UE 115-E may also include a processor 1105, and memory 1115 (including software (SW)) 1120, a transceiver 1135, and one or more antenna(s) 1140, each of which may communicate, directly or indirectly, with one another (e.g., via buses 1145). The transceiver 1135 may communicate bi-directionally, via the antenna(s) 1140 or wired or wireless links, with one or more networks, as described above. For example, the transceiver 1135 may communicate bi-directionally with a base station 105 or another UE 115. The transceiver 1135 may include a modem to modulate the packets and provide the modulated packets to the antenna(s) 1140 for transmission, and to demodulate packets received from the antenna(s) 1140. While UE 115-e may include a single antenna 1140, the UE 115-e may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., joint channel and phase noise estimation, etc.). Alternatively, the software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an application specific integrated circuit (ASIC), etc.).

Figure 12:
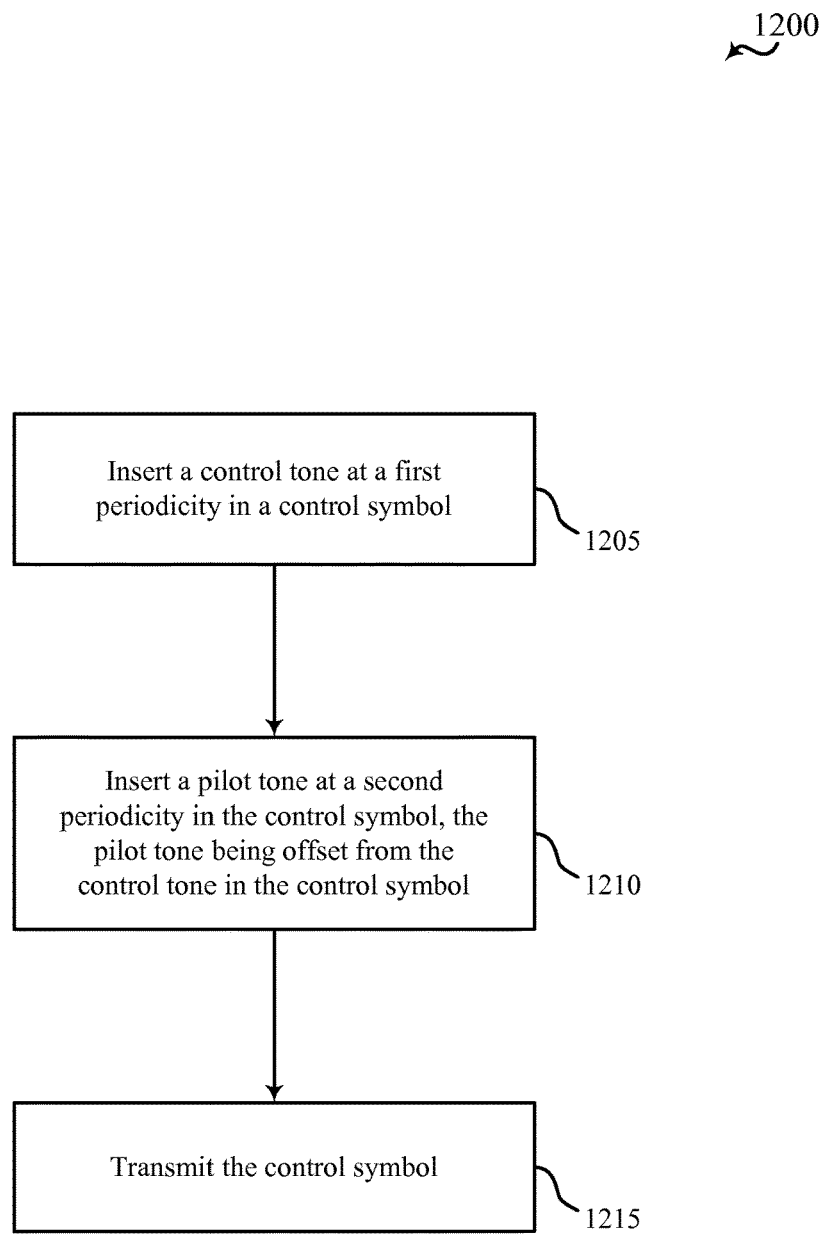
FIG. 12 illustrates an example method for joint channel and phase noise estimation in accordance with various aspects of the present disclosure.

FIG. 12 illustrates an example method 1200 for joint channel and phase noise estimation in accordance with various aspects of the present disclosure. The operations of method 1200 may be implemented by a BS 105, a UE 115, or their components as described with reference to FIGS. 1-11. For example, the operations of method 1200 may be performed by the BS control symbol component 140 as described with reference to FIGS. 1, and 6-9. In some examples, the BS 105 may execute a set of codes to control the functional elements of the BS 105 to perform the functions described below. Additionally or alternatively, the BS 105 may perform aspects the functions described below using special-purpose hardware.

At block 1205, the BS 105 may insert a control tone at a first periodicity in a first subcarrier of a control symbol as described with reference to FIGS. 2-5. In certain examples, the operations of block 1205 may be performed by the BS control tone module 705 as described with reference to FIG. 7.

At block 1210, the BS 105 may insert a pilot tone at a second periodicity in a second subcarrier of the control symbol, the pilot tone being offset from the control tone in the control symbol as described with reference to FIGS. 2-5. In certain examples, the operations of block 1410 may be performed by the BS pilot tone module 710 as described with reference to FIG. 7.

At block 1215, the BS 105 may transmit the control symbol as described with reference to FIGS. 2-5. In certain examples, the operations of block 1215 may be performed by the BS transmitter 620 as described with reference to FIGS. 6-8.

Figure 13:
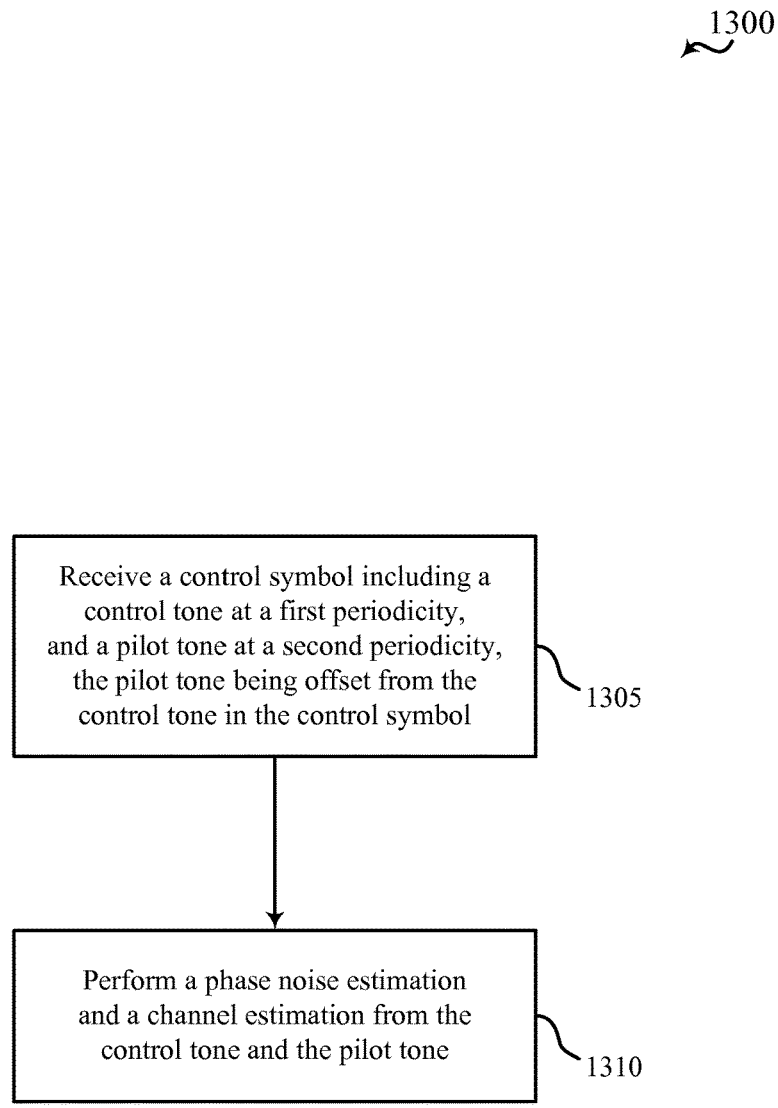
FIG. 13 illustrates an example method for joint channel and phase noise estimation in accordance with various aspects of the present disclosure.

FIG. 13 illustrates an example method 1300 for joint channel and phase noise estimation in accordance with various aspects of the present disclosure. The operations of method 1300 may be implemented by a UE 115 or its components as described with reference to FIGS. 1-11. For example, the operations of method 1300 may be performed by the UE control symbol component 145 as described with reference to FIGS. 1 and 9-11. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of method 1200 of FIG. 12.

At block 1305, the UE 115 may receive a control symbol comprising a control tone at a first periodicity, and a pilot tone at a second periodicity, the pilot tone being offset from the control tone in the control symbol. In certain examples, the operations of block 1505 may be performed by the UE receiver 910 as described with reference to FIG. 9.

At block 1310, the UE 115 may perform performing a phase noise estimation and a channel estimation from the pilot tone as described with reference to FIGS. 2-5. In certain examples, the operations of block 1310 may be performed by the estimation component 1015 as described with reference to FIG. 10.

Thus, methods 1200 and 1300 may provide for joint channel and phase noise estimation. It should be noted that methods 1200 and 1300 describe possible implementation, and that the operations and the steps may be rearranged or otherwise modified such that other implementations are possible. In some examples, aspects from two or more of the methods 1200 and 1300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   inserting control tones at a plurality of subcarriers of a control symbol at a first periodicity;
   inserting a pilot tone at a second periodicity in a second subcarrier of the control symbol, the pilot tone being offset from each of the control tones in the control symbol by one or more intervening subcarriers; and
   transmitting at least two control symbols in a sub-frame.

2. The method of claim 1, wherein inserting the pilot tone at the second periodicity further comprises:
   inserting the pilot tone every nth subcarrier.

3. The method of claim 2, wherein n is a value greater than one.

4. The method of claim 2, further comprising:
   determining n based at least in part on a channel delay spread, a phase noise level, a channel noise level, or combinations thereof.

5. The method of claim 1, further comprising:
   determining the offset based at least in part on one or both of a channel delay spread and a phase noise level.

6. The method of claim 1, wherein the offset comprises four subcarriers.

7. The method of claim 1, wherein the first periodicity is equal to the second periodicity.

8. The method of claim 7, wherein the first periodicity and the second periodicity are every eight tones in a frequency domain of at least one of the control symbols.

9. The method of claim 1, wherein at least one of the control symbols include alternating control tones and pilot tones separated by unoccupied subcarriers.

10. The method of claim 1, wherein transmitting the at least two control symbols further comprises:
    transmitting the control tones at a lower power than the pilot tone.

11. The method of claim 1, wherein the frequency of transmitting the at least two control symbols is based at least in part on a velocity of a wireless device and a frequency of channel change.

12. The method of claim 11, wherein the at least two control symbols comprises a symbol that comprises only pilot tones and null tones.

13. The method of claim 11, wherein the wireless device comprises a millimeter wave (mmW) radio.

14. The method of claim 1, wherein transmitting the at least two control symbols further comprises transmitting the control symbol within a millimeter wave (mmW) radio spectrum frequency.

15. The method of claim 1, further comprising:
determining a phase of a series of pilot tones based at least in part on a pseudo-noise sequence or a Zadoff-Chu sequence.

16. The method of claim 1, further comprising:
determining a phase of a series of pilot tones based at least in part on a user equipment (UE) identification (ID), a beam ID, or combinations thereof.

17. The method of claim 1, further comprising:
precoding control information for the control tones with a discrete Fourier transform.

18. An apparatus for wireless communication, comprising:
a control tone module for inserting control tones at a plurality of subcarriers of a control symbol at a first periodicity;
a pilot tone module for inserting a pilot tone at a second periodicity in a second subcarrier of the control symbol, the pilot tone being offset from each of the control tones in the control symbol by one or more intervening subcarriers; and
a transmitter for transmitting at least two control symbols in a sub-frame.

19. The apparatus of claim 18, wherein inserting the pilot tone at the second periodicity further comprises:
inserting the pilot tone every nth subcarrier.

20. The apparatus of claim 19, wherein n is a value greater than one.

21. The apparatus of claim 19, further comprising:
a control symbol component for determining n based at least in part on a channel delay spread, a phase noise level, a channel noise level, or combinations thereof.

22. The apparatus of claim 18, further comprising:
a control symbol component for determining the offset based at least in part on one or both of a channel delay spread and a phase noise level.

23. The apparatus of claim 18, wherein the offset comprises four subcarriers.

24. The apparatus of claim 18, wherein the first periodicity is equal to the second periodicity.

25. The apparatus of claim 24, wherein the first periodicity and the second periodicity are every eight tones in a frequency domain of at least one of the control symbols.

26. The apparatus of claim 18, wherein at least one of the control symbols include alternating control tones and pilot tones separated by unoccupied subcarriers.

27. The apparatus of claim 18, further comprising:
a power component for transmitting the control tones at a lower power than the pilot tone.

28. The apparatus of claim 18, wherein the frequency of transmitting the at least two control symbols is based at least in part on a velocity of a wireless device and a frequency of channel change.

29. The apparatus of claim 28, wherein the at least two control symbols comprises a symbol that comprises only pilot tones and null tones.

30. The apparatus of claim 28, wherein the transmitter comprises a millimeter wave (mmW) radio.

31. The apparatus of claim 28, wherein the transmitter is further for transmitting the at least two control symbols within a millimeter wave (mmW) radio spectrum frequency.

32. The apparatus of claim 28, wherein the pilot tone module is further for determining a phase of a series of pilot tones based at least in part on a pseudo-noise sequence or a Zadoff-Chu sequence.

33. The apparatus of claim 28, wherein the pilot tone module is further for determining a phase of a series of pilot tones based at least in part on a user equipment (UE) identification (ID) and a beam identification (ID).

34. The apparatus of claim 28, wherein the control tone module is further for precoding control information for the control tones with a discrete Fourier transform.

35. An apparatus for wireless communication, comprising:
a processor;
memory in electronic communication with the processor; and
instructions stored in the memory and operable, when executed by the processor, to cause the apparatus to:
insert control tones at a plurality of subcarriers of a control symbol at a first periodicity;
insert a pilot tone at a second periodicity in a second subcarrier of the control symbol, the pilot tone being offset from each of the control tones in the control symbol by one or more intervening subcarriers; and
transmit at least two control symbols in a sub-frame.

36. The apparatus of claim 35, wherein the instructions are further operable to cause the apparatus to:
insert the pilot tone every nth subcarrier.

37. The apparatus of claim 36, wherein n is a value greater than 1.

38. The apparatus of claim 36, wherein the instructions are further operable to cause the apparatus to:
determine n based at least in part on a channel delay spread, a phase noise level, a channel noise level, or combinations thereof.

39. The apparatus of claim 35, wherein the instructions are further operable to cause the apparatus to:
determine the offset based at least in part on one or both of a channel delay spread and a phase noise level.

40. The apparatus of claim 35, wherein the offset comprises four subcarriers.

41. The apparatus of claim 35, wherein the first periodicity is equal to the second periodicity.

42. The apparatus of claim 41, wherein the first periodicity and the second periodicity are every eight tones in a frequency domain of at least one of the control symbols.

43. The apparatus of claim 35, wherein at least one of the control symbols include alternating control tones and pilot tones separated by unoccupied subcarriers.

44. The apparatus of claim 35, wherein the instructions are further operable to cause the apparatus to:
transmit the control tones at a lower power than the pilot tone.

45. The apparatus of claim 35, wherein the frequency of transmitting the at least two control symbols is based at least in part on a velocity of a wireless device and a frequency of channel change.

46. The apparatus of claim 35, wherein the at least two control symbols comprises a symbol that comprises only pilot tones and null tones.

47. The apparatus of claim 45, wherein the wireless device comprises a millimeter wave (mmW) radio.

48. The apparatus of claim 45, wherein the instructions are further operable to cause the apparatus to:
transmit the at least two control symbols within a millimeter wave (mmW) radio spectrum frequency.

49. The apparatus of claim 45, wherein the instructions are further operable to cause the apparatus to:
determine a phase of a series of pilot tones based at least in part on a pseudo-noise sequence or a Zadoff-Chu sequence.

50. The apparatus of claim 45, wherein the instructions are further operable to cause the apparatus to:
determine a phase of a series of pilot tone based at least in part on a user equipment (UE) identification (ID) and a beam identification (ID).

51. The apparatus of claim 45, wherein the instructions are further operable to cause the apparatus to:
precode control information for the control tones with a discrete Fourier transform.

52. A non-transitory computer-readable medium storing code for wireless communication, the code comprising instructions executable to:
insert control tones at a plurality of subcarriers of a control symbol at a first periodicity;
insert a pilot tone at a second periodicity in a second subcarrier of the control symbol, the pilot tone being offset from each of the control tones in the control symbol by one or more intervening subcarriers; and
transmit at least two control symbols in a sub-frame.

53. The non-transitory computer-readable medium of claim 52, the code further comprising instructions executable to:
insert the pilot tone every nth subcarrier.

54. The non-transitory computer-readable medium of claim 53, wherein n is a value greater than one.

55. The non-transitory computer-readable medium of claim 53, the code further comprising instructions executable to:
determine n based at least in part on a channel delay spread, a phase noise level, a channel noise level, or combinations thereof.

56. The non-transitory computer-readable medium of claim 52, the code further comprising instructions executable to:
determine the offset based at least in part on one or both of a channel delay spread and a phase noise level.

57. The non-transitory computer-readable medium of claim 52, wherein the offset comprises four subcarriers.

58. The non-transitory computer-readable medium of claim 52, wherein the first periodicity is equal to the second periodicity.

59. The non-transitory computer-readable medium of claim 58, wherein the first periodicity and the second periodicity are every eight tones in a frequency domain of at least one of the control symbols.

60. The non-transitory computer-readable medium of claim 52, wherein at least one of the control symbols include alternating control tones and pilot tones separated by unoccupied subcarriers.

61. The non-transitory computer-readable medium of claim 52, the code further comprising instructions executable to:
transmit the control tones at a lower power than the pilot tone.

62. The non-transitory computer-readable medium of claim 52, wherein the frequency of transmitting the at least two control symbols is based at least in part on a velocity of a wireless device and a frequency of channel change.

63. The non-transitory computer-readable medium of claim 62, wherein the at least two control symbols comprises a symbol that comprises only pilot tones and null tones.

64. The non-transitory computer-readable medium of claim 62, wherein the wireless device comprises a millimeter wave (mmW) radio.

65. The non-transitory computer-readable medium of claim 52, wherein the instructions are executable to:
transmit the at least two control symbols within a millimeter wave (mmW) radio spectrum frequency.

66. The non-transitory computer-readable medium of claim 52, wherein the instructions are executable to:
determine a phase of a series of pilot tones based at least in part on a pseudo-noise sequence or a Zadoff-Chu sequence.

67. The non-transitory computer-readable medium of claim 52, wherein the instructions are executable to:
determine a phase of a series of pilot tones based at least in part on a user equipment (UE) identification (ID) and a beam identification (ID).

68. The non-transitory computer-readable medium of claim 52, wherein the instructions are executable to:
precode control information for the control tones with a discrete Fourier transform.

69. A method for wireless communication, comprising:
receiving at least two control symbols in a sub-frame, at least one of the control symbols comprising control tones at a plurality of subcarriers at a first periodicity, and a pilot tone at a second periodicity, the pilot tone being offset from each of the control tones in at least one of the control symbols by one or more intervening subcarriers; and
performing a phase noise estimation and a channel estimation from the pilot tone.

70. The method of claim 69, further comprising:
determine control information from the control tones, wherein determining control information is based at least in part on channel and phase noise estimation.

71. The method of claim 69, wherein performing the phase noise estimation and the channel estimation further comprises:
compensating at least one of the control symbols based on the phase noise estimation; and
performing the channel estimation based on the compensated phase noise.

72. An apparatus for wireless communication, comprising:
a receiver for receiving at least two control symbols in a sub-frame, at least one of the control symbols comprising control tones at a plurality of subcarriers at a first periodicity, and a pilot tone at a second periodicity, the pilot tone being offset from each of the control tones in at least one of the control symbols by one or more intervening subcarriers; and
an estimation component for performing a phase noise estimation and a channel estimation from the pilot tone.

73. The apparatus of claim 72, the estimation component further for determining control information from the control tones, wherein determining control information is based at least in part on channel and phase noise estimation.

74. The apparatus of claim 72, the estimation component further for compensating at least one of the control symbols based at least in part on the phase noise estimation and performing the channel estimation based on the compensated phase noise.

75. An apparatus for wireless communication, comprising:
a processor;
memory in electronic communication with the processor; and instructions stored in the memory and operable, when executed by the processor, to cause the apparatus to:

receive at least two control symbols in a sub-frame, at least one of the control symbols comprising control tones at a plurality of subcarriers at a first periodicity, and a pilot tone at a second periodicity, the pilot tone being offset from each of the control tones in at least one of the control symbols by one or more intervening subcarriers; and perform a phase noise estimation and a channel estimation from the pilot tone.

76. The apparatus of claim 75, wherein the instructions are further operable to cause the apparatus to:

determine control information from the control tones, wherein determining control information is based at least in part on channel and phase noise estimation.

77. The apparatus of claim 75, wherein the instructions are further operable to cause the apparatus to:

compensate at least one of the control symbols based at least in part on the phase noise estimation; and perform the channel estimation based on the compensated phase noise.

78. A non-transitory computer-readable medium storing code for wireless communication, the code comprising instructions executable to:

receive at least two control symbols in a sub-frame, at least one of the control symbols comprising control tones at a plurality of subcarriers at a first periodicity, and a pilot tone at a second periodicity, the pilot tone being offset from each of the control tones in at least one of the control symbols by one or more intervening subcarriers; and perform a phase noise estimation and a channel estimation from the pilot tone.

79. The non-transitory computer-readable medium of claim 78, wherein the instructions are executable to:

determine control information from the control tones, wherein determining control information is based at least in part on channel and phase noise estimation.

80. The non-transitory computer-readable medium of claim 78, the code further comprising instructions executable to:

compensate at least one of the control symbols based at least in part on the phase noise estimation; and perform the channel estimation based on the compensated phase noise.

* * * * *